United States Patent [19]

Wetzold

[11] 4,148,272
[45] Apr. 10, 1979

[54] THAW DURATION DETECTOR
[75] Inventor: Paul W. Wetzold, Armonk, N.Y.
[73] Assignee: Paula Mann, New York, N.Y.
[21] Appl. No.: 894,754
[22] Filed: Apr. 10, 1978
[51] Int. Cl.² ............................................. G01K 11/08
[52] U.S. Cl. .................................... 116/219; 58/1 R; 116/207
[58] Field of Search ............ 73/356, 358; 23/253 TP; 116/114 AM, 114 V, 114 Y, 114.5; 58/1 R; 426/88

[56] References Cited

U.S. PATENT DOCUMENTS

| | | | |
|---|---|---|---|
| 2,460,215 | 1/1949 | Chase | 116/114.5 |
| 2,823,131 | 2/1958 | Power | 116/114.5 |
| 2,850,393 | 9/1958 | Romito | 116/114.5 |
| 3,055,759 | 9/1962 | Busby | 116/114.5 |
| 3,414,415 | 12/1968 | Broad | 116/114.5 |
| 3,420,205 | 1/1969 | Morison | 116/114.5 |
| 3,695,903 | 10/1972 | Telkes | 116/114.5 |

*Primary Examiner*—S. Clement Swisher
*Assistant Examiner*—Denis E. Corr
*Attorney, Agent, or Firm*—Lackenbach, Lilling & Siegel

[57] ABSTRACT

A thaw duration detector is provided by filling the bottom of an open ended heat sealable plastic pouch with a dilute aqueous indicator solution, freezing said indicator solution in the bottom of the pouch, positioning an absorbent strip having an indicator strip secured thereto at one end thereof within said pouch with the indicator strip near the open end of the pouch and the other end of the absorbent strip close to the frozen solution, and then heat sealing the pouch across the same to provide a first compartment in which the frozen aqueous solution is confined, and at least one further compartment containing the absorbent strip.

7 Claims, 3 Drawing Figures

THAW DURATION DETECTOR

The present invention relates to a thaw duration detector intended to be associated with a frozen food package for the purpose of indicating when this package has thawed for any preselected period of time. The invention is particularly concerned with the production of such thaw duration detectors in a manner which will insure operativeness when the frozen food package is subjected to rapid freezing as is commonly carried out.

In the thaw duration detector under consideration, water is frozen into a first sealed compartment, and an elongated absorbent strip extends into this first compartment to be wetted by the water in the event of thawing. The time of thawing is determined by the length and absorbency characteristics of the absorbent strip, but when the liquid water finally migrates through the strip, it reaches an indicator strip. The water has added to it a small amount of a chemical reagent which activates the indicator (usually by causing a color change) to show that the package has thawed for too long a time.

Thaw duration detectors are known to the art, but the water used has been provided in a form which becomes available for the first time when the package is frozen, as by inclusion in a glass capsule which breaks on freezing or by the use of an emulsion paste which loses its emulsion characteristic on freezing to release the water contained therein.

In this invention, the dilute aqueous liquid is supplied to the storage compartment and frozen therein before the compartment is completed and prior to assembly with the absorbent strip. In this way, extraneous structure is eliminated and release of water on subsequent thawing is assured.

More particularly, and in accordance with this invention, a thaw duration detector is produced by filling the bottom of an open ended heat sealable plastic pouch with a dilute aqueous indicator solution, freezing the indicator solution in the bottom of the pouch, positioning an absorbent strip having an indicator strip secured thereto at one end thereof within the pouch with the indicator strip near the open end of the pouch and the other end of the absorbent strip just above and close to the frozen solution, and then heat sealing the pouch across the same to provide a first compartment in which the frozen aqueous solution is confined, and at least one further compartment containing the absorbent strip.

The invention includes the thaw duration detector so-produced in which the frozen aqueous solution fills the bottom of the first compartment.

The invention will be more fully understood from the description of the formation of an illustrative thaw duration detector, taken in conjunction with the accompanying drawings in which.

Figure 1:
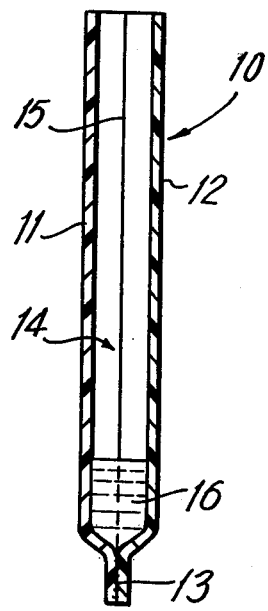
FIg. 1 is a cross section taken through a plastic pouch in an early stage of manufacture when the aqueous solution contained therein is liquid.

Referring more particularly to the drawings, the numeral 10 identifies a plastic pouch constructed of thin film heat sealable thermoplastic material, at least one wall of which is necessarily transparent. In FIG. 1, the pouch 10 is constituted by opposed walls 11 and 12 which are heat sealed across the bottom as indicated at 13 and divided into spaced compartments, such as the compartment 14, by vertical heat seals shown at 15.

The pouch 10 is held in a vertical position, and a small amount of water containing a small amount of some reagent, such as phosphoric acid, is inserted into the bottom of the chamber 14, as with a dropper, the dilute phosphoric acid aqueous solution being identified at 16. The structure shown in FIG. 1 is subjected to freezing, as by passing the vertical pouch (as part of a long row of pouches) through a bath of liquid nitrogen, and this freezes the aqueous phosphoric acid solution.

Figure 2:
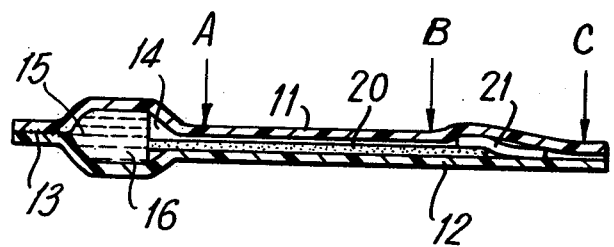
FIG. 2 is a cross section, similar to FIG. 1, but after freezing, assembly with the absorbent strip and indicator strip, just prior to final heat sealing.

The pouch 10 with the frozen solution at the bottom thereof, is then preferably placed on its side as shown in FIG. 2, and an absorbent strip 20 secured to an indicator strip 21 is placed in the pouch with the indicator strip 21 near the open end of the pouch. When the FIG. 2 assembly is completed, the assembly is again heat sealed, this time across the pouch so as to form a plurality of compartments within the pouch. The lines of heat sealing are indicted in FIG. 2 by arrows A, B, and C.

Figure 3:
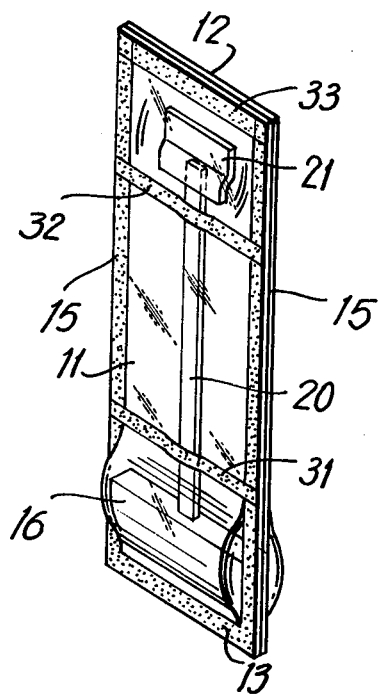
FIG. 3 is a perspective view of the final sealed detector, with the water still frozen therein, ready to be associated with a frozen food package.

The heat sealing of the pouch with the prefrozen aqueous solution therein does not disturb the frozen nature of the solution, and the final structure is shown in FIG. 3, ready to be associated with a frozen food package.

The transverse heat seals noted in FIG. 2 have now been carried out and are indicated at 31 and 32 and 33 in FIG. 3. This divides the pouch into a first compartment in which the frozen aqueous solution is confined, a second compartment containing the absorbent paper providing the elongated strip 20, and a third compartment, remote from the first, in which the indicator strip 21 is disposed. Of course, the second and third compartments can be combined, but separate compartments provide added security. The indicator is desirably glued to hold it to the absorbent strip.

The plastic pouch is preferably constituted by polyethylene, but polyvinylidene chloride is also appropriate, and polystyrene is also useful.

The capacity of the first compartment, which can also be considered the reservoir is preferably about 1cc. The entire structure is about 25 by 90 mm, the reservoir extending for a distance of about 25 mm, with the absorbent strip being 5mm in width and extending for 52mm. The indicator strip may be 10mm by 10mm.

The operation of the detector is quite simple, thawing producing a dilute phosphoric acid solution which migrates through the absorbent strip at a controlled rate so as to produce a predetermined time lapse controlled by the width, length and absorbency of the strip.

To more particularly illustrate a preferred embodiment, the indicator strip may be a universal indicator which changes color from yellow to red when in contact with an acid, and the phosphoric acid solution may have a concentration of 0.2%. The indicator strip can be constituted by grade 615 filter paper which provides a speed of migration of 2 mm. per minute. Other examples of preferred indicator solutions are 3% acetic acid and 0.05% sodium hydroxide. However, soluble starch solutions and the like are also useful.

The invention is defined in the claims which follow.

I claim:

1. A method for producing a thaw duration detector comprising: filling the bottom of an open ended heat sealable, transparent thermoplastic pouch with a dilute aqueous indicator solution; freezing the indicator solution in the bottom of the pouch; positioning an absorbent strip having an indicator strip secured thereto at one end thereof within said pouch with the indicator strip near the top end of the pouch and the other end of the absorbent strip just above and close to the frozen solution; heat sealing the lower portion of the pouch to provide a first compartment wherein the frozen aqueous solution is confined and isolated along with the lower end of said absorbent strip; heat sealing the upper portion of the pouch to provide second and third compartments; said second compartment containing the major portion of the absorbent strip, said third compartment containing the indicator strip in contact with the absorbent strip, whereby the absorbent strip absorbs a thawed indicator solution at a controlled rate to produce a predetermined time lapse prior to contacting the indicator strip.

2. A method as recited in claim 1 in which said aqueous solution is a dilute solution of phosphoric acid.

3. A method as recited in claim 1 in which said aqueous solution is a dilute solution of acetic acid.

4. A method as recited in claim 1 in which said aqueous solution is a dilute solution of sodium hydroxide.

5. A thaw duration detector comprising: a heat sealable, transparent, thermoplastic pouch divided by heat seals into a plurality of isolated compartments comprising a first lower compartment containing and confining a frozen aqueous indicator solution and a lower portion of an absorbent strip positioned just above and close to the frozen solution, a second compartment containing the major portion of the absorbent strip, and a third compartment containing the indicator strip in contact with the absorbent strip; said absorbent strip being designed to absorb the thawed indicator solution at a controlled rate to produce a predetermined time lapse prior to contacting the indicator strip.

6. The detector of claim 5 wherein said thermoplastic pouch is made of a material selected from the group consisting of polyethylene, polyvinylidene chloride, and polystyrene.

7. The detector of claim 5 wherein said aqueous solution is selected from the group consisting of phosphoric acid, acetic acid, and sodium hydroxide.

* * * * *